May 25, 1954     H. HORNSCHUCH     2,679,414
SEPARATOR FOR SHAFTS
Filed Feb. 1, 1949

INVENTOR
HANNS HORNSCHUCH
BY
HIS ATTORNEY.

Patented May 25, 1954

2,679,414

UNITED STATES PATENT OFFICE 2,679,414

SEPARATOR FOR SHAFTS

Hanns Hornschuch, Easton, Pa., assignor to Ingersoll-Rand Company, New York, N. Y., a corporation of New Jersey Application February 1, 1949, Serial No. 73,919

2 Claims. (Cl. 287—117)

My invention relates to power shafting, and more particularly to power shafting fastened together by means of threaded couplings.

One object of my invention is to facilitate the uncoupling of power shafting when threaded couplings are used.

Another object of my invention is to insert a compression member between the opposed end portions of the rotary shafts when the shafts are coupled together to prevent the opposed shaft ends from abutting each other.

Another object of my invention is to construct the compression member of such a material that it may be readily changed to a form that will relieve the compressive stresses on the coupling.

Other objects will be in part obvious and in part pointed out hereinafter.

Figure 1:
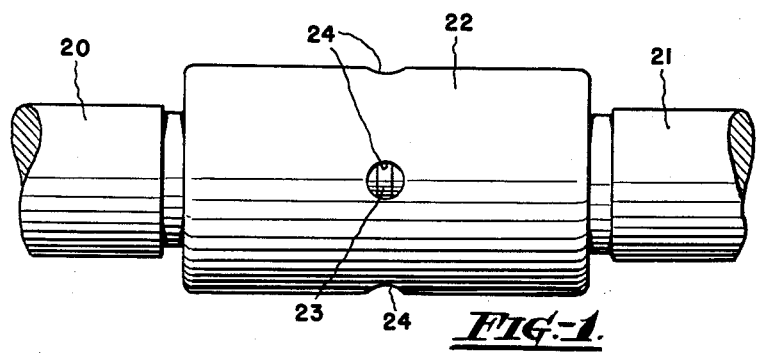
Figure 2:
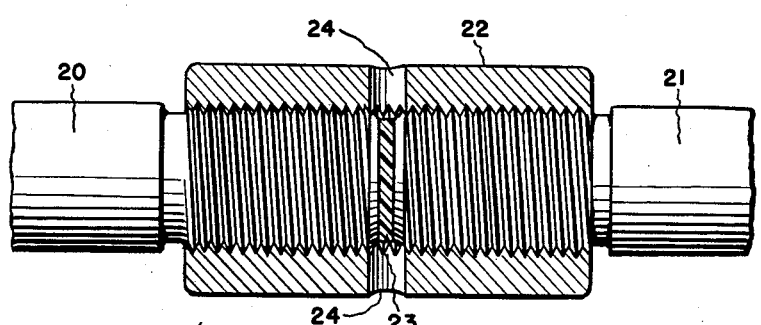
Figure 3:
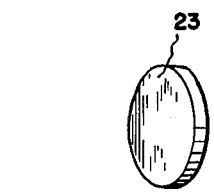

In the drawings accompanying this specification and in which similar reference numbers refer to similar parts, Figure 1 is a longitudinal view of a threaded coupling embodying my invention, Figure 2 is a longitudinal view, partly broken, and Figure 3 is a perspective view of a detail.

Referring more particularly to the drawings, the figures show two rotary shafts 20—21 coupled together by a sleeve 22 encircling the opposed end portions of the shafts and threadingly engaged therewith. A rigid compression member 23 acting as a spacer is inserted between the opposed end portions of the rotary shafts. A plurality of holes 24 in the sleeve 22 around its circumference at the center provide access to the compression member.

The compression member 23 may be constructed of any material which may be more readily altered than the material of the adjacent parts by means of some agent to relieve the compressive stresses on the coupling. In the preferred arrangement shown in the drawing, the compression member is a disk whose opposed side surfaces abut and conform to the surfaces of the opposed shaft ends and is constructed of a plastic material which melts before the material of the adjacent parts when subjected to heat.

In practice, when power is applied to the shaft, the assembly screws together with high compressive loads on the surfaces of the shaft ends. These compressive loads tend to lock the threads and prevent the unscrewing of the assembly. By applying heat to the compression member 23 through the holes 24 in the sleeve 22 the compression member is melted. When the member has melted sufficiently to render the disk pliant, the compressive loads on the shaft ends are relieved and the coupling may then be easily unscrewed.

From the foregoing it can be seen that the compression member may be constructed of many materials and that many agents may be used in order to change it to a form which will relieve the stresses on the ends of the shaft i. e., a plastic might be used which would be rendered pliant by the application of a chemical solvent. The arrangement shown in the drawing is only a preferred arrangement selected to illustrate the principle of the invention. Any material may be used which, when acted upon by an external agent, will yield more readily than the materials of the adjacent parts. By an external agent is meant any means, physical or chemical, which will act on the material of the disk in such a way as to render the disk pliant and thereby destroy the disk's ability to function as a spacer and compression member.

I claim:

1. In a coupling device, a rotary drive shaft, a rotary driven shaft, a sleeve encircling the opposed end portions of the shafts and threadingly engaged therewith, a rigid disk interposed between said shafts abutting the opposed end portions of the shafts, said disk being constructed of a plastic material which may be rendered pliant by the application of an external agent, and a plurality of openings in the sleeve communicating with the disk to allow said application of said external agent to the disk in order to relieve the stresses on the sleeve.

2. In a coupling device, a rotary drive shaft, a rotary driven shaft, a sleeve encircling the opposed end portions of the shafts and threadingly engaged therewith, a rigid disk interposed between said shafts abutting the opposed end portions of the shafts, said disk being constructed of a plastic material which may be rendered pliant by the application of heat, and a plurality of openings in the sleeve communicating with the disk to allow the application of heat to the disk in order to render the disk pliant to relieve the stresses on the sleeve.

References Cited in the file of this patent

UNITED STATES PATENTS

| Number | Name | Date |
|---|---|---|
| 61,741 | Jillson | Feb. 5, 1867 |
| 236,957 | Ott | Jan. 25, 1881 |
| 595,437 | Greenfield | Dec. 14, 1897 |
| 1,035,816 | Allen | Aug. 13, 1912 |
| 1,264,189 | Keator | Apr. 30, 1918 |
| 1,497,396 | Wry | June 10, 1924 |
| 1,734,186 | Weidmann et al. | Nov. 5, 1929 |
| 1,743,888 | Hamister | Jan. 14, 1930 |
| 1,776,502 | Gresley et al. | Sept. 23, 1930 |
| 1,921,809 | Crain | Aug. 8, 1933 |
| 1,978,814 | Myers | Oct. 30, 1934 |
| 2,108,760 | Weiher | Feb. 15, 1938 |
| 2,337,711 | Crake | Dec. 28, 1943 |
| 2,419,592 | Richardson | Apr. 29, 1947 |